United States Patent
Sandhu et al.

(10) Patent No.: US 12,554,426 B2
(45) Date of Patent: Feb. 17, 2026

(54) HANDLING GROWN BAD BLOCKS IN A MEMORY DEVICE

(71) Applicant: Sandisk Technologies, Inc., Milpitas, CA (US)

(72) Inventors: Navkiran Sandhu, Dublin, CA (US); Abhra Koley, San Jose, CA (US); Rajan Paudel, Mountain View, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 107 days.

(21) Appl. No.: 18/584,113

(22) Filed: Feb. 22, 2024

(65) Prior Publication Data
US 2025/0272014 A1 Aug. 28, 2025

(51) Int. Cl.
*G06F 3/06* (2006.01)

(52) U.S. Cl.
CPC ............ *G06F 3/064* (2013.01); *G06F 3/0604* (2013.01); *G06F 3/0679* (2013.01)

(58) Field of Classification Search
CPC ...... G06F 3/064; G06F 3/0604; G06F 3/0679; G11C 29/42; G11C 29/1201; G11C 29/4401; G11C 2029/1202; G11C 2029/5006; G11C 29/025
See application file for complete search history.

(56) References Cited

U.S. PATENT DOCUMENTS 10,707,226 B1 * 7/2020 Yang ................ G11C 16/10
2024/0055063 A1 * 2/2024 Puthenthermadam ................
G11C 29/06

* cited by examiner

*Primary Examiner* — Francisco A Grullon
(74) *Attorney, Agent, or Firm* — DENTONS Durham Jones Pinegar

(57) ABSTRACT

A data storage device includes a bad block management system. The bad block management system detects a grown bad block of the data storage device. When a grown bad block is detected, the bad block management system initiates a manual block write process on the wordlines associated with the grown bad block. The manual block write process includes programming the wordlines of the grown bad block in a particular state and with a voltage that closes a leakage path between a bit line associated with the grown bad block and a ground line or a ground path associated with the grown bad block.

20 Claims, 6 Drawing Sheets

HANDLING GROWN BAD BLOCKS IN A MEMORY DEVICE

BACKGROUND

A non-volatile storage device typically includes a number of memory dies and each memory die includes a number of memory blocks. Over the lifetime of the non-volatile storage device, some of the memory blocks may fail. When a memory block fails, it is marked or identified as a grown bad block.

In current implementations, when a memory block is identified as a grown bad block, the memory device causes the memory block to enter a fail state. For example, the memory block is configured to be in a partially erased state or a fully erased state. Additionally, the memory block is marked as being in the fail state.

However, even though the memory block is in a fail state, the memory block is still open, which leads to a risk of double memory block selection. For example, a good memory block and the grown bad block may share the same bit line. During a write operation, the grown bad block and the good memory block may both be selected. As a result, a voltage that is provided to the good memory block will be consumed by the grown bad block causing the write operation to fail. If this issue persists, the non-volatile storage device is at risk of entering a read-only mode.

Accordingly, it would be beneficial to reduce or eliminate the risk of double block selection when a memory block is identified as a grown bad block.

SUMMARY

The present disclosure describes a data storage device, such as a NAND data storage device, having a bad block management system. The bad block management system determines whether one or more memory blocks of the data storage device have grown bad or can otherwise be classified as a grown bad block. If the bad block management system identifies a grown bad block, or otherwise determines that a particular memory block has grown bad, the bad block management system initiates a manual block write process on the wordlines associated with the grown bad block. The manual block write process closes a leakage path between a bit line associated with the grown bad block and a ground line or a ground path associated with the grown bad block.

For example, during the manual block write process, one or more wordlines associated with the grown bad block are programmed in a particular state (e.g., programmed as a '0') using a particular voltage. In an example, the particular voltage is a voltage (or a range of voltages) that is higher than a voltage (or higher than a range of voltages) that is used when the good memory blocks (e.g., memory blocks that are not identified as grown bad blocks) are being programmed. For example, the particular voltage is higher than a voltage associated with a drain select gate and/or a voltage associated with a source select gate of the memory die on which the grown bad block is detected.

In addition, some of the wordlines of the grown bad block are programmed at a voltage that is higher than the particular voltage. For example, some of the wordlines of the grown bad block are programmed to the particular state using the highest possible voltage. Programming different wordlines at different voltages helps ensure the leakage path is completely closed.

Because the wordlines of the grown bad block are programmed using higher voltages (e.g., when compared with the voltage that is used to program the good memory blocks), a current path between the bit line associated with the grown bad block and the ground path associated with the grown bad block is effectively closed or shut down. That is, a current cannot pass through the wordlines of the grown bad block due to the higher than normal voltage at which the wordlines are programmed. As such, the risk of double block selection is effectively neutralized.

Accordingly, examples of the present disclosure describe a method that includes identifying a grown bad block of a memory device and determining whether the grown bad block is correctable. If it is determined the grown bad block is correctable, one or more wordlines associated with the grown bad block are identified. When the wordlines associated with the grown bad block are identified, a manual block write process is performed on the one or more wordlines. In an example, the manual block write process closes a leakage path associated with the grown bad block.

Other examples of the present disclosure describe a data storage device that includes a controller and a bad block management system. In an example, the bad block management system identifies whether a memory block of the data storage device is classifiable as a grown bad block. If the bad block management system classifies the memory block as a grown bad block, the bad block management system identifies a plurality of wordlines associated with the memory block. The bad block management system also initiates a manual block write process on the plurality of wordlines of the memory block. In an example, the manual block write process closes a current leakage path associated with the memory block.

The present disclosure also describes a non-volatile storage device that includes one or more memory dies. The non-volatile storage device also includes means for determining whether a memory block of the one or more memory dies is a grown bad block. The non-volatile storage device also includes means for identifying a plurality of wordlines associated with the memory block. In an example, the non-volatile storage device also includes means for performing a manual block write process on the plurality of wordlines associated with the memory block to close a leakage path associated with the memory block.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
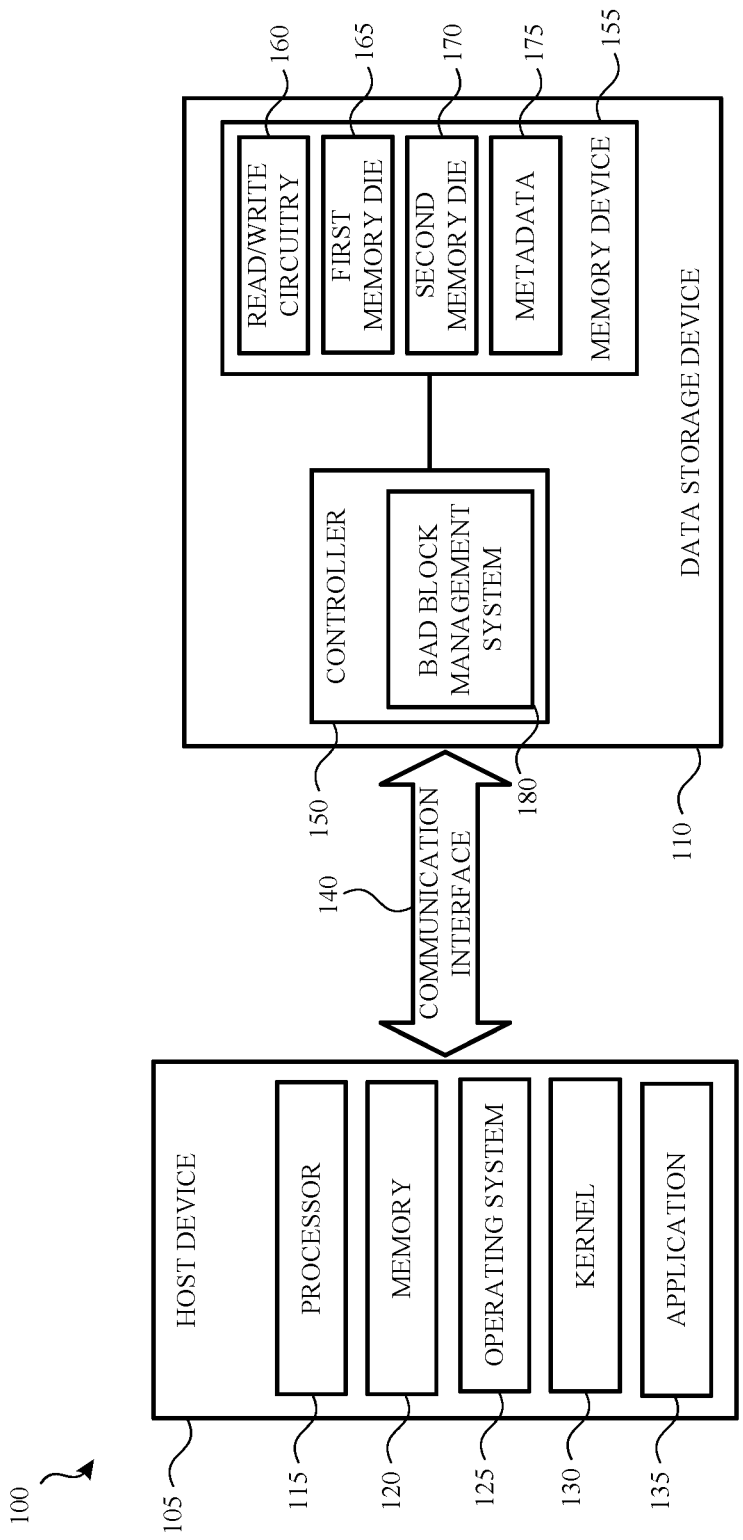
FIG. 1 is a block diagram of a system that includes a host device and a data storage device according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. The following detailed description is therefore not to be taken in a limiting sense, and the scope of the present disclosure is defined by the appended claims and their equivalents.

As previously discussed, a data storage device typically includes a number of memory dies and each of the memory dies include multiple different memory blocks. However, when the data storage device is in use (e.g., in the field), one or more of the memory blocks may fail. Memory blocks can fail for a variety of different reasons including normal wear and tear (e.g., due to multiple program/erase (P/E) cycles) or other factors. When a memory block fails, it is marked or identified as a grown bad block.

In current implementations, a memory block that is identified as a grown bad block enters a fail state. When the memory block is in the fail state, the memory block is partially or fully erased and/or is associated with a fail state identifier. However, even though the memory block is in a fail state, the memory block is typically still open. As a result, there is a risk that the failed memory block (referred to as the grown bad block), along with a good memory block, will be selected as part of a write operation. This is referred to as a double memory block selection.

The double memory block selection typically occurs because the good memory block and the grown bad block share the same bit line. If both memory blocks are selected, the grown bad block will consume the voltage intended for the good memory block and cause the write operation to fail. If this condition persists, the data storage device may enter a read-only mode.

To address the above, the present disclosure describes a data storage device that includes a bad block management system. The bad block management system determines whether one or more memory blocks of the data storage device have grown bad or can otherwise be classified as a grown bad block. If the bad block management system identifies a grown bad block, or otherwise determines that a particular memory block has grown bad, the bad block management system initiates a manual block write process on the wordlines associated with the memory block that has grown bad (referred to as the "grown bad block"). The manual block write process closes a leakage path between a bit line associated with the grown bad block and a ground line or a ground path associated with the grown bad block.

For example, during the manual block write process, one or more wordlines associated with the grown bad block are programmed in a particular state using a particular voltage. In an example, the particular voltage is a voltage that is higher than a voltage that is used when good memory blocks, or memory blocks that are not identified as grown bad blocks, are programmed. In an example, the particular voltage is higher than a voltage associated with a drain select gate and/or a voltage associated with a source select gate of the memory die on which the grown bad block is located. In addition, some of the wordlines of the grown bad block are programmed at a voltage that is higher than the particular voltage. For example, some of the wordlines are programmed in the particular state using a highest possible voltage.

Because the wordlines of the grown bad block are programmed using higher voltages (e.g., when compared with the voltage that is used to program the good memory blocks), a current path between the bit line associated with the grown bad block and the ground path associated with the grown bad block is effectively closed or shut down. As such, the grown bad block cannot or will not consume the voltage that is intended for the good memory block. For example, a current cannot pass through the wordlines of the grown bad block due to the higher than normal voltage at which the wordlines are programmed.

In accordance with the above, many technical benefits may be realized including, but not limited to, reducing or eliminating the risk for double block selection when a grown bad block is detected and increasing a reliability of memory dies and the data storage device when a memory block associated with the data storage device has grown bad.

These benefits, along with other examples, will be shown and described in greater detail with respect to FIG. 1-FIG. 6.

FIG. 1 is a block diagram of a system 100 that includes a host device 105 and a data storage device 110 according to an example. In an example, the host device 105 includes a processor 115 and a memory 120 (e.g., main memory). The memory 120 may include or otherwise be associated with an operating system 125, a kernel 130 and/or an application 135.

The processor 115 can execute various instructions, such as, for example, instructions from the operating system 125 and/or the application 135. The processor 115 may include circuitry such as a microcontroller, a Digital Signal Processor (DSP), an Application-Specific Integrated Circuit (ASIC), a Field Programmable Gate Array (FPGA), hard-wired logic, analog circuitry and/or various combinations thereof. In an example, the processor 115 may include a System on a Chip (SoC).

In an example, the memory 120 can be used by the host device 105 to store data used, or otherwise executed by, the processor 115. Data stored in the memory 120 may include instructions provided by the data storage device 110 via a communication interface 140. The data stored in the memory 120 may also include data used to execute instructions from the operating system 125 and/or one or more applications 135. The memory 120 may be a single memory or may include multiple memories, such as, for example one or more non-volatile memories, one or more volatile memories, or a combination thereof.

In an example, the operating system 125 may create a virtual address space for the application 135 and/or other processes executed by the processor 115. The virtual address space may map to locations in the memory 120. The operating system 125 may also include or otherwise be associated with a kernel 130. The kernel 130 may include instructions for managing various resources of the host device 105 (e.g., memory allocation), handling read and write requests and so on.

The communication interface 140 communicatively couples the host device 105 and the data storage device 110. The communication interface 140 may be a Serial Advanced Technology Attachment (SATA), a PCI express (PCIe) bus, a Small Computer System Interface (SCSI), a Serial Attached SCSI (SAS), Ethernet, Fibre Channel, or Wi-Fi. As such, the host device 105 and the data storage device 110 need not be physically co-located and may communicate over a network such as a Local Area Network (LAN) or a Wide Area Network (WAN), such as the internet. In addition, the host device 105 may interface with the data storage device 110 using a logical interface specification such as Non-Volatile Memory express (NVMe) or Advanced Host Controller Interface (AHCI).

The data storage device 110 includes a controller 150 and a memory device 155. In an example, the controller 150 is communicatively coupled to the memory device 155. In an example, the memory device 155 includes one or more memory dies (e.g., first memory die 165 and second memory die 170). Although memory dies are specifically mentioned, the memory device 155 may include any non-volatile memory device, storage device, storage elements or storage medium including NAND flash memory cells and/or NOR flash memory cells.

The memory cells can take the form of solid-state (e.g., flash) memory cells and can be one-time programmable, few-time programmable, or many-time programmable. Additionally, the memory cells may be single-level cells (SLCs), multi-level cells (MLCs), triple-level cells (TLCs), quad-level cells (QLCs), penta-level cells (PLCs), and/or use any other memory technologies. The memory cells may be arranged in a two-dimensional configuration or a three-dimensional configuration.

In an example, the data storage device 110 is attached to or embedded within the host device 105. In another example, the data storage device 110 is implemented as an external device or a portable device that can be communicatively or selectively coupled to the host device 105. In yet another example, the data storage device 110 is a component (e.g., a solid-state drive (SSD)) of a network accessible data storage system, a network-attached storage system, a cloud data storage system, or the like.

As indicated above, the memory device 155 of the data storage device 110 includes a first memory die 165 and a second memory die 170. Although two memory dies are shown, the memory device 155 may include any number of memory dies (e.g., one memory die, two memory dies, eight memory dies, or another number of memory dies).

The memory device 155 also includes support circuitry. In an example, the support circuitry includes read/write circuitry 160. The read/write circuitry 160 supports the operation of the memory dies of the memory device 155. Although the read/write circuitry 160 is depicted as a single component, the read/write circuitry 160 may be divided into separate components, such as, for example, read circuitry and write circuitry. The read/write circuitry 160 may be external to the memory dies of the memory device 155. In another example, one or more of the memory dies may include corresponding read/write circuitry 160 that is operable to read data from and/or write data to storage elements within one individual memory die independent of other read and/or write operations on any of the other memory dies.

In an example, one or more of the first memory die 165 and the second memory die 170 include one or more memory blocks. In an example, each memory block includes one or more memory cells. A block of memory cells is the smallest number of memory cells that are physically erasable together. In an example and for increased parallelism, each of the blocks may be operated or organized in larger blocks or metablocks. For example, one block from different planes of memory cells may be logically linked together to form a metablock.

Figure 2A:
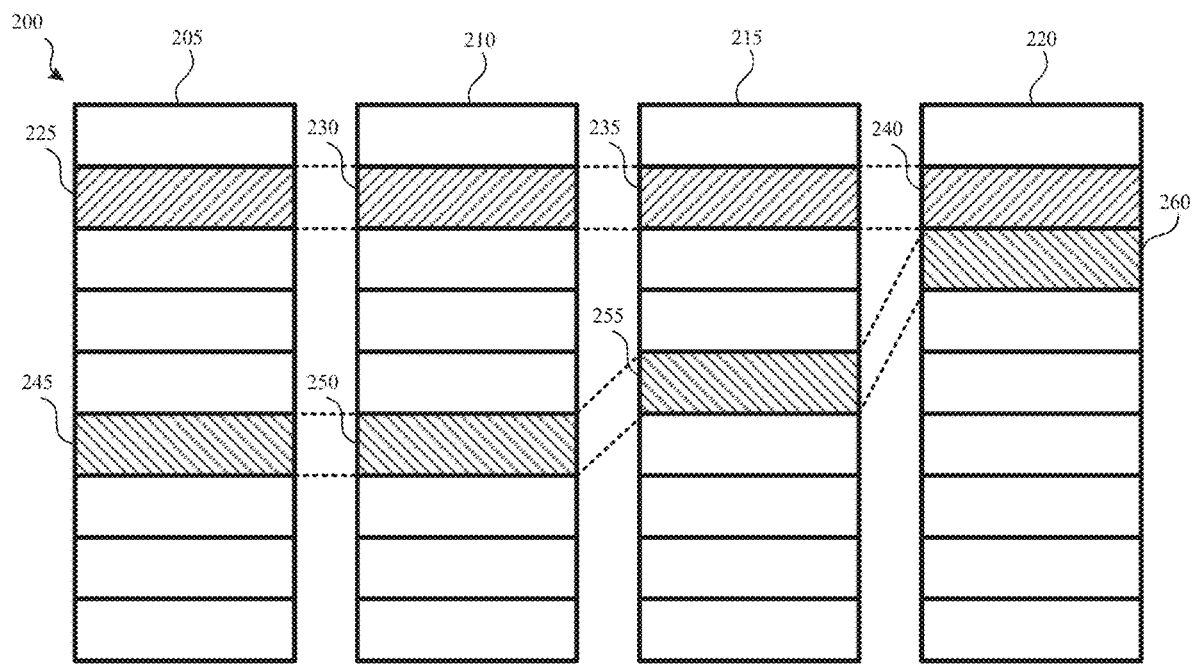
FIG. 2A illustrates how a memory die includes a number of memory blocks according to an example.

For example and referring to FIG. 2A, a memory device 200 (e.g., a storage element, a memory die, a non-volatile memory device) includes four planes or sub-arrays (e.g., a first plane 205, a second plane 210, a third plane 215, and a fourth plane 220). In an example, the planes are integrated on a single memory die, are provided on two different memory dies (e.g., two planes on each memory die) or are provided on four separate memory dies. Although four planes are shown and described, the memory device 200 may have any number of planes and/or memory dies.

In an example, the planes are divided into memory blocks consisting memory cells. As shown in FIG. 2A, the rectangles represent each memory block, such as memory block 225, memory block 230, memory block 235 and memory block 240. There may be dozens or hundreds of memory blocks in each plane of the memory device 200. In an example, each memory block is a unit of erase and is sometimes referred to as an erase block. For example, memory block 225, memory block 230, memory block 235 and memory block 240 include a minimum number of memory cells that are erased together.

In addition, various memory blocks may be logically linked or grouped together (e.g., using a table in or otherwise accessible by the controller 150) to form a metablock. A metablock may be written to, read from and/or erased as a single unit. For example, memory block 225, memory block 230, memory block 235 and memory block 240 may form a first metablock while memory block 245, memory block 250, memory block 255 and memory block 260 may form a second metablock. The memory blocks used to form a metablock need not be restricted to the same relative locations within their respective planes.

Figure 2B:
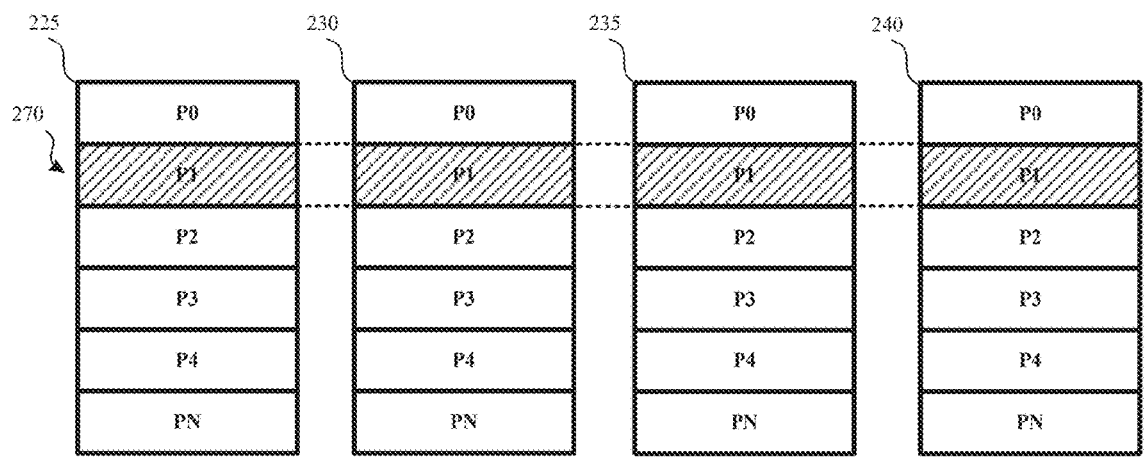
FIG. 2B illustrates how a memory block includes one or more pages according to an example.

In an example, each memory block may be divided, for operational purposes, into pages of memory cells, such as illustrated in FIG. 2B. For example, the memory cells of memory block 225, memory block 230, memory block 235 and memory block 240 are divided into N different pages (shown as P0-PN). Although a specific number of pages are shown in FIG. 2B, a memory block may have any number of pages of memory cells within each memory block.

In an example, a page is a unit of data programming within the memory block. Each page includes the minimum amount of data that can be programmed at one time. The minimum unit of data that can be read at one time may be less than a page. A metapage 270 is illustrated in FIG. 2B as being formed of one physical page from memory block 225, memory block 230, memory block 235 and memory block 240. In the example, shown, the metapage 270 includes page P1 in each of the four memory blocks. However, the pages of the metapage 270 need not have the same relative position within each of the memory blocks. A metapage 270 may be the maximum unit of programming within a memory block.

The memory blocks disclosed in FIG. 2A-FIG. 2B are referred to herein as physical memory blocks because they relate to groups of physical memory cells as discussed above. As used herein, a logical memory block is a virtual unit of address space defined to have the same size as a physical memory block. Each logical memory block includes a range of logical memory block addresses (LBAs) that are associated with data received from a host. The LBAs are then mapped to one or more physical memory blocks in the data storage device 110 where the data is physically stored.

Figure 2C:
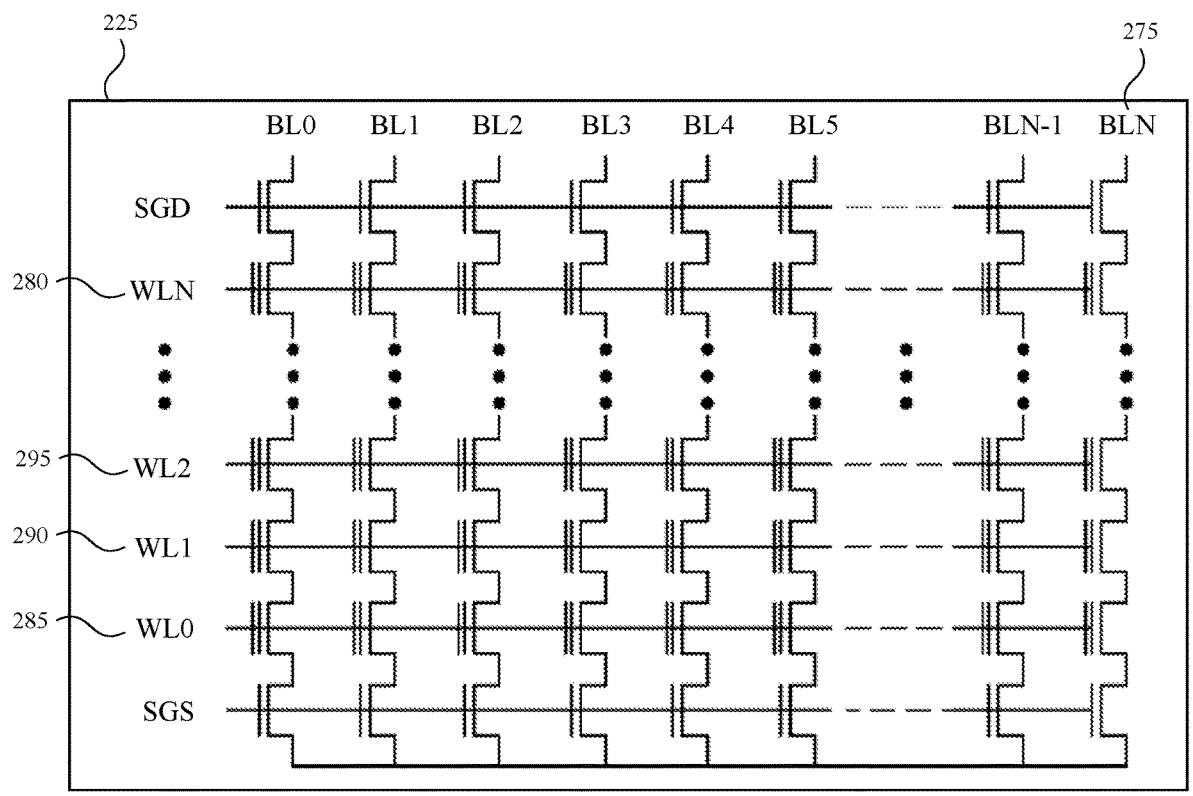
FIG. 2C illustrates how a memory block includes a number of memory cells according to an example.

As indicated above, each memory block may include any number of memory cells. The design, size, and organization of a memory block may depend on the architecture, design, and application desired for each memory die. In an example, the memory block includes a contiguous set of memory cells that share a plurality of wordlines and bit lines. For example and as shown in FIG. 2C, the memory block 225 includes bit lines BL0-BLN (collectively bit lines 275), where N is a total number of bit lines. Additionally, the memory block 225 includes wordlines WL0-WLN (collectively wordlines 280), where N is a total number of wordlines. In an example, multiple memory blocks can share the same bit line.

A wordline 280 may function as a single-level-cell (SLC) wordline, a multi-level-cell (MLC) wordline, a tri-level-cell (TLC) wordline, a quad-level cell (QLC) wordline, a penta-level cell (PLC) wordline and so on. Additionally, each memory cell may be programmable to a state (e.g., a threshold voltage in a flash configuration or a resistive state in a resistive memory configuration) that indicates one or more values.

In the example shown in FIG. 2C, four memory cells are connected in series to form a NAND string. Although four memory cells are depicted, any number of memory cells (e.g., 16, 32, 64, 128, 256 or any other number or memory cells) may be used. One terminal of the NAND string is connected to a corresponding bit line via a drain select gate (connected to select gate drain line SGD) and another terminal of the NAND string is connected to a source line via a source select gate (connected to select gate source line SGS). Additionally, although eight bit lines are shown in FIG. 2C, any number of bit lines may be used.

As previously described, the data storage device 110 also include a controller 150. The controller 150 is communicatively coupled to the memory device 155 via a bus, an interface or other communication circuitry. In an example, the communication circuitry may include one or more channels to enable the controller 150 to communicate with the first memory die 165 and/or the second memory die 170 of the memory device 155. In another example, the communication circuitry may include multiple distinct channels which enables the controller 150 to communicate with the first memory die 165 independently and/or in parallel with the second memory die 170 of the memory device 155.

The controller 150 receives data and/or instructions from the host device 105. The controller 150 also sends data to the host device 105. For example, the controller 150 sends data to and/or receives data from the host device 105 via the communication interface 140. The controller 150 also sends data and/or commands to, and/or receive data from, the memory device 155.

The controller 150 sends data and a corresponding write command to the memory device 155 to cause the memory device 155 to store data at a specified address of the memory device 155. In an example, the write command specifies a physical address of a portion of the memory device 155. In an example, the controller 150 also provides or otherwise causes data that is to be written at the specified portion of the memory device 155 (e.g., a grown bad block) to be written at a particular voltage and/or state based, at least in part, on the identification and/or a determination that a particular memory block of a memory die has grown bad.

The controller 150 also sends data and/or commands associated with one or more background scanning operations, garbage collection operations, and/or wear leveling operations. The controller 150 also sends one or more read commands to the memory device 155. In an example, the read command specifies the physical address of a portion of the memory device 155 at which the data is stored. The controller 150 may also track the number of program/erase cycles or other programming operations that have been performed on or by the memory device and/or the memory dies of the memory device 155.

The controller 150 also includes, or is otherwise associated with, a bad block management system 180. In an example, the bad block management system 180 is a packaged functional hardware unit designed for use with other components/systems. In another example, the bad block management system 180 is a portion of a program code (e.g., software or firmware) executable by a processor or processing circuitry. In yet another example, the bad block management system 180 is a self-contained hardware and/or software component that interfaces with other components and/or systems. Although the bad block management system 180 is shown as being part of the controller 150, the bad block management system 180 may be separate from the controller 150.

In an example, the bad block management system 180 is operable, along with the controller 150, to determine whether one or more memory blocks of the memory dies have grown bad or are otherwise classifiable as a grown bad block. In an example, the bad block management system 180 determines whether a memory block has grown bad or is classifiable as a grown bad block using any grown bad block detection method.

For example, the data storage device 110 and/or the memory device 155 includes circuitry, firmware and/or software to determine whether a particular memory block (e.g., memory block 225 (FIG. 2A) has grown bad. In such examples, when a memory block is determined to have grown bad, or is otherwise classified as a grown bad block, information associated with the grown bad block is provided to the bad block management system 180. In an example, this information includes, but is not limited to, a bit line associated with the grown bad block, the wordlines associated with the grown bad block, a memory die on which the grown bad block is located and so on.

In an example, the additional information described above is stored as metadata 175. Although specific information is described, the metadata 175 also includes, but is not limited to, a number of program/erase cycles the memory device 155 and/or the memory dies have undergone, whether one or more memory blocks of the memory dies have been identified as grown bad blocks, whether the grown bad block is correctable and the like. Although specific examples are given, the metadata 175 may include additional information.

When a memory block has been identified as a grown bad block and the bad block management system 180 receives the additional information, the bad block management system 180 determines whether the memory device 155 and/or the data storage device has reached its end of life. For example, the bad block management system 180 may determine (e.g., using metadata 175) whether a threshold number of program erase (P/E) cycles have been reached. In an example, if the threshold number of P/E cycles have been reached or it is otherwise determined that the data storage device 110 is at its end of life, the bad block management system 180 determines that the grown bad block will not be corrected.

However, if the bad block management system 180 determines that the data storage device 110 and/or the memory device 155 is not at its end of life, the bad block management system 180 determines whether the memory block that is classified or identified as a grown bad block is correctable. In an example, the bad block management system 180 uses one or more tools and/or operations to determine whether the grown bad block is correctable. Example tools/operations include, but are not limited to, performing one or more read/verify operations, analyzing error correction codes and/or the time it takes to perform an error correction process on the data stored in the memory block, performing a number of read and/or write operations and so on.

In an example, if the bad block management system 180 determines, using the one or more operations previously described, that the grown bad block is not correctable, the bad block management system 180 notifies the controller 150 and/or the host device 105 that the memory block is not correctable. However, if the bad block management system 180 determines that the grown bad block is correctable, the bad block management system 180 initiates a manual block write on the grown bad block.

In an example, the manual block write closes a leakage path or a current path between a bit line associated with the grown bad block and a ground line or a ground path associated with the grown bad block. For example, as part of the manual block write, the grown bad block identifies the wordlines and/or the bit line associated with the grown bad block and causes each wordline of the grown the grown bad block to be programmed in a particular state. In an example, the particular state is an erased state or a state in which the memory cells of the grown bad block are programmed with a '0'.

Additionally, the wordlines of the grown bad block are programmed with a particular voltage. In an example, the particular voltage is a voltage that is higher than the voltage that is used to program the wordlines of the good memory blocks of the memory device 155. For example, the wordlines of the good memory blocks are programmed using a first voltage. As such, manual block write causes the wordlines of the grown bad block to be programmed using a second voltage that is higher than the first voltage. In an example, the second voltage is higher than a voltage associated with a drain select gate and/or a voltage associated with a source select gate of the memory die on which the grown bad block is located.

In an example, because the wordlines of the grown bad block are programmed using the higher voltage, a current path between the bit line associated with the grown bad block and the ground path associated with the grown bad block is effectively closed. For example, a current cannot pass through the wordlines of the grown bad block due to the higher than normal voltage at which the wordlines are programmed.

In an example, and to help ensure the leakage path is closed, the bad block management system 180 selects one or more additional wordlines of the grown bad block. These additional wordlines are programmed, in the particular state, at a third voltage that is higher than the second voltage. For example, some of the wordlines are programmed in the particular state using a highest possible programming voltage.

In an example, the wordlines that are programmed using the third voltage are selected and/or programmed after the first programming operation (e.g., after the wordlines are programmed using the second voltage) of the manual block write has occurred. For example, the wordlines are programmed using the second voltage, and are subsequently programmed using the third voltage. In another example, the wordlines are selected and/or programmed using the third voltage during, or after, the first programming operation. For example, during the manual block write process, a first subset of wordlines are selected and programmed using the second voltage and a second subset of wordlines are selected and programmed using the third voltage.

In an example, the first subset of wordlines and the second subset of wordlines include any number of wordlines. However, in some examples, the second subset of wordlines includes a minimum number of wordlines (e.g., four). It is also contemplated that not all of the wordlines of the grown bad block will be programmable. In such examples, the bad block management system 180 will track or identify the wordlines that are not programmable and/or ensure that at least a minimum number of wordlines are programmed using the third voltage.

Figure 3:
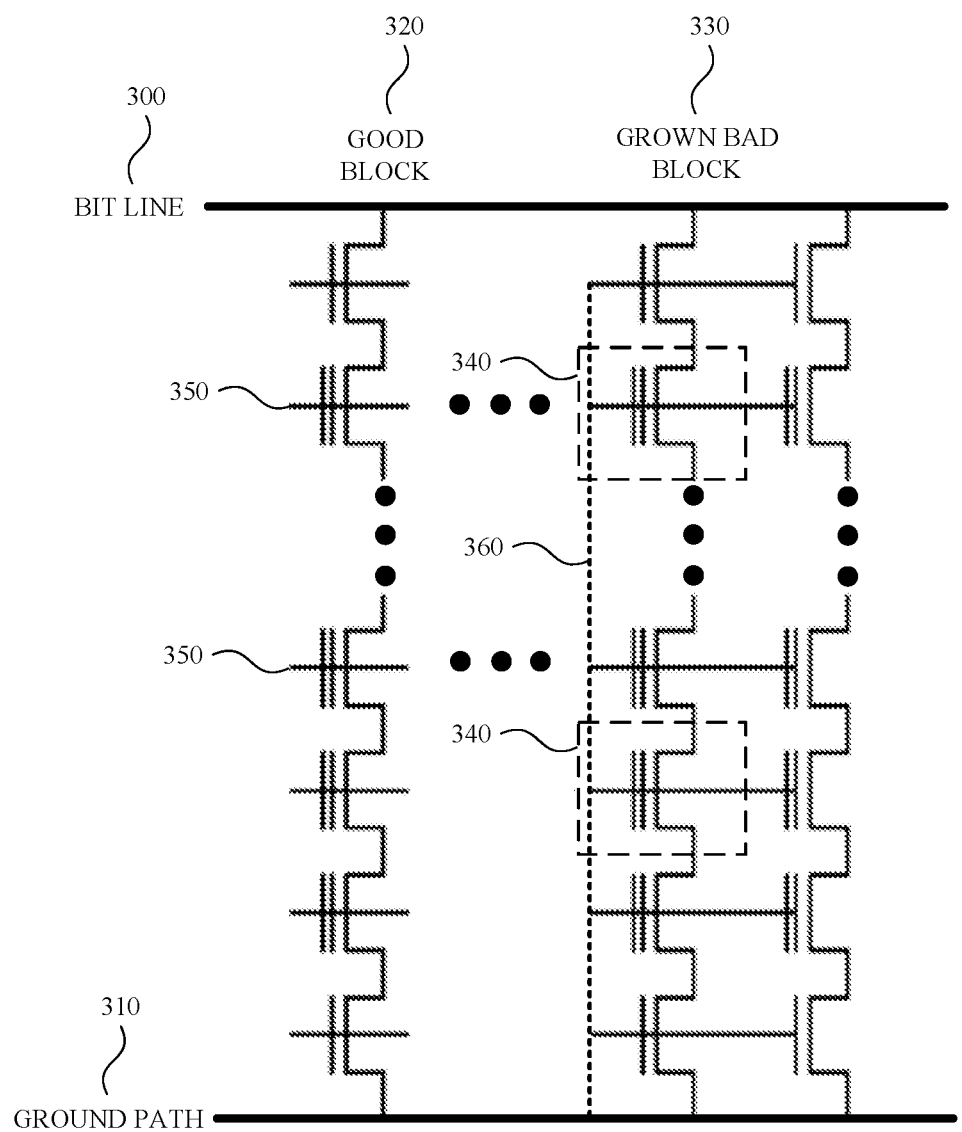
FIG. 3 illustrates how a manual block write process performed on a grown bad block of a memory die closes a leakage path between a bit line associated with the grown bad block and a ground path associated with the grown bad block according to an example.

FIG. 3 illustrates how a manual block write process performed on a grown bad block 330 of a memory die closes a leakage path 360 between a bit line 300 associated with the grown bad block 330 and a ground path 310 associated with the grown bad block 330 according to an example. In an example, closing the leakage path 360 helps prevent a good block 320 and the grown bad block 330 from being selected (e.g., a double block selection) during a program or a write operation performed on the good block 320. For example, because the good block 320 and the grown bad block 330 share a common bit line 300, there is a risk that a voltage provided to the good block 320 will be consumed by the grown bad block 330 and travel, via the leakage path 360, to the ground path 310.

In an example, the grown bad block 330 is identified and/or classified as a grown bad block by a bad block management system (e.g., the bad block management system 180 (FIG. 1)). In an example, when the grown bad block 330 is identified, the bad block management system determines whether the grown bad block 330 is correctable. If it is determined the grown bad block 330 is correctable, the various wordlines 350 associated with the grown bad block 330 are identified.

The bad block management system initiates and/or performs the manual block write process on some or all of the wordlines 350 associated with the grown bad block 330. In an example, the manual block write process is a process in which all of the wordlines 350 of the grown bad block 330 are programmed in a particular state (e.g., programmed with a '0'). Additionally, the bad block management system causes a first subset of wordlines 350 associated with the grown bad block 330 to be programmed using a particular voltage.

In an example, the particular voltage is a voltage that is higher than a voltage that is used to program the wordlines 350 associated with the good block 320. For example, when the wordlines 350 of the good block 320 are programmed, they are programmed using a first voltage (or a first range of voltages). However, during the manual block write process, the wordlines 350 (or a first subset of wordlines) of the grown bad block 330 are programmed to the particular state using a second voltage (or a second range of voltages) that is higher than the first voltage. In an example, the bad block management system identifies or selects the first subset of wordlines that will be programmed using the second voltage. The bad block management system also determines or identifies the first voltage and/or the second voltage.

In an example, the bad block management system also selects a second subset of wordlines (indicated by the dashed rectangle 340) that will be programmed using a third voltage (or a third range of voltages). The third voltage is higher than both the first voltage and the second voltage. In an example the third voltage is a highest possible voltage at which the wordlines 350 of the grown bad block 330 are programmable.

Programming the second subset of wordlines 340 using the third voltage provides an extra layer of security to help ensure the leakage path 360 associated with the grown bad block 330 is closed. For example, it helps ensure that any current/voltage provided on the bit line 300 and intended for the good block 320 cannot be consumed by, or pass to any wordlines 350, of the grown bad block 330.

Figure 4:
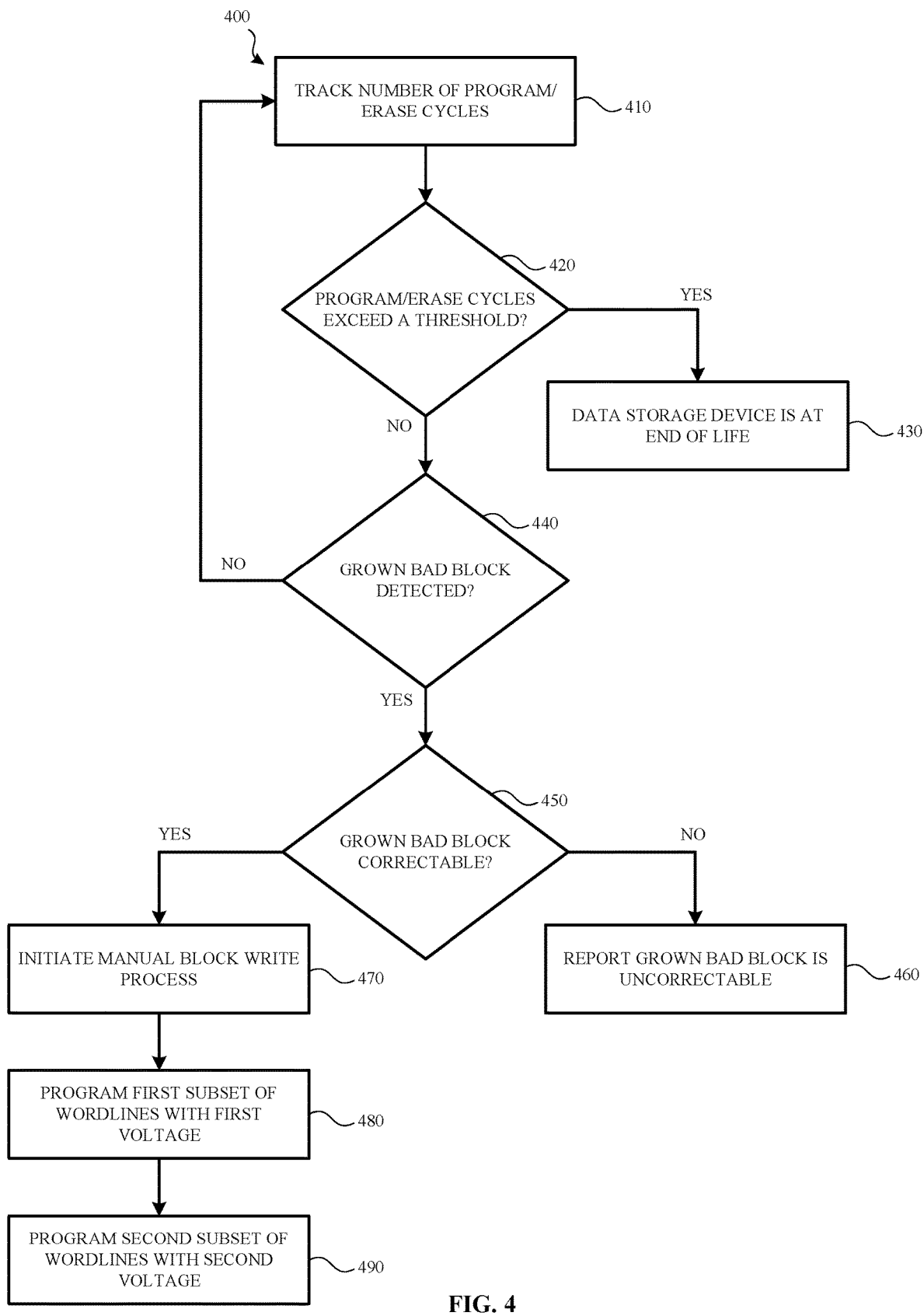
FIG. 4 illustrates a method for closing a leakage path associated with a grown bad block according to an example.

FIG. 4 illustrates a method 400 for closing a leakage path associated with a grown bad block according to an example. In an example, the method 400 is performed by a controller, firmware and/or a bad block management system associated with a memory device and/or a data storage device (e.g., the data storage device 110 (FIG. 1) and/or the memory device 155 (FIG. 1)). For example, the method 400 is performed or executed by the controller 150 (FIG. 1) and/or the bad block management system 180 (FIG. 1). Additionally, in some examples, the method 400 is performed when the data storage device and/or the memory device is being used by a consumer (e.g., when the data storage device and/or the memory device is in the field).

Method 400 begins when the data storage device is in use (e.g., is in the field) and the controller and/or the bad block management system tracks (410) the number of program/erase (P/E) cycles of the data storage device. Although P/E cycles are specifically mentioned, other benchmarks may be monitored or identified to determine whether the data storage device is nearing (or has reached) its end of life.

The bad block management system then determines (420) whether a threshold number of P/E cycles have been reached. If it is determined that the number of P/E cycles exceeds the threshold, the bad block management system determines the data storage device is at its end of life (430). In such examples, the bad block management system stops monitoring for grown bad blocks.

However, if it is determined (420) that the number of P/E cycles does not exceed the threshold, the bad block management system monitors the status of one or more memory blocks of the data storage device to identify and/or classify memory blocks as grown bad blocks. If the bad block management system does not detect (440) or identify a grown bad block, the method 400 repeats.

However, when a grown bad block is detected (440), the bad block management system determines (450) whether the grown bad block is correctable. In an example, the bad block management system determines whether the grown bad block is correctable based on a number of operations or tests. These tests or operations include, but are not limited to, performing one or more read/verify operations, analyzing error correction codes associated with the grown bad block, determining an amount of time it takes to perform an error correction process on the data stored in the grown bad block and so on.

If the bad block management system determines (450) the grown bad block is not correctable, the bad block management system reports (460) (e.g., to a host device and/or a controller of the data storage device) that the grown bad block is uncorrectable. However, if the bad block management system determines the grown bad block is correctable, the bad block management system initiates (470) a manual block write process.

In an example, the manual block write process closes a current leakage path associated with the grown bad block. As such, the manual block write process reduces or eliminates the risk of a double memory block selection such as previously described.

In an example, the manual write process includes selecting and programming (480) first subset of wordlines of the grown bad block in a first state and using a first voltage. In an example, the first voltage is a voltage that is higher, or greater than, a voltage that is used to program good memory blocks of the data storage device.

The manual write process also includes selecting and programming (490) a second subset of wordlines of the grown bad block in the first state and using a second voltage. In an example, the second voltage is higher or greater than the first voltage. Programming the wordlines of the grown bad blocks using these voltage "closes" the wordlines of the grown bad block and helps ensure that a current or voltage provided on a bit line associated with a good memory block and the grown bad block cannot pass through the wordlines of the grown bad block to a ground path.

Figure 5:
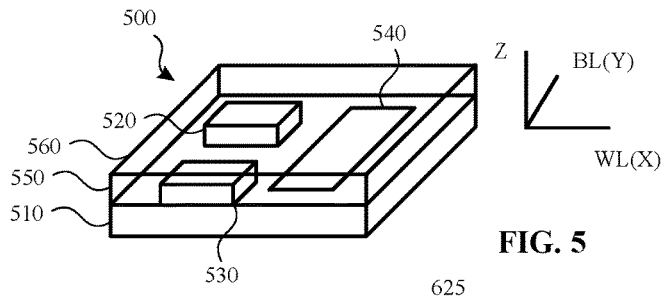
FIG. 5 is a perspective view of a storage device that includes three-dimensional (3D) stacked non-volatile memory according to an example.
Figure 6:
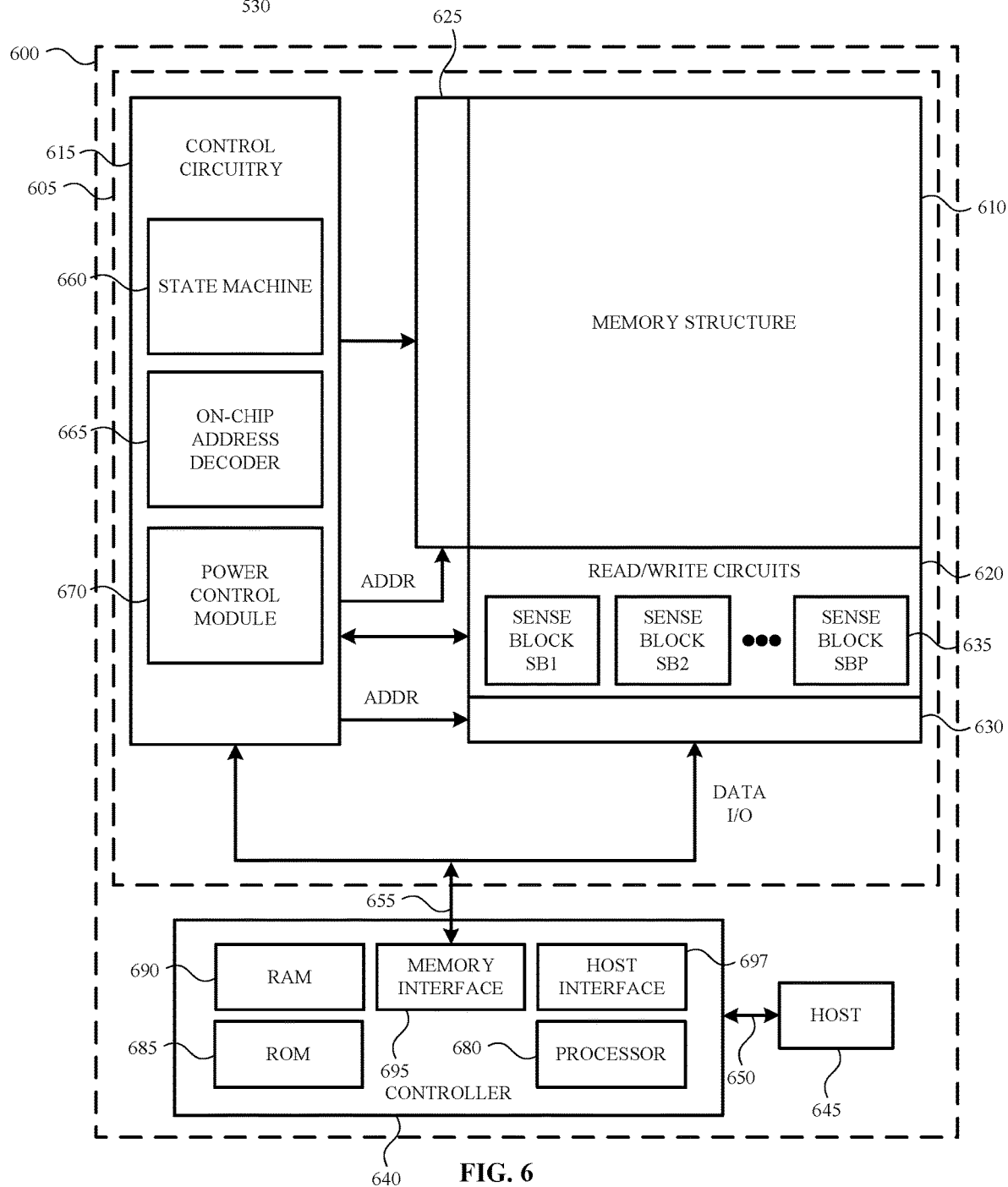
FIG. 6 is a block diagram of a storage device according to an example.

FIG. 5-FIG. 6 describe example storage devices that may be used with or otherwise implement the various features described herein. For example, the storage devices shown and described with respect to FIG. 5-FIG. 6 may include various systems and components that are similar to the systems and components shown and described with respect to FIG. 1. For example, the controller 640 shown and described with respect to FIG. 6 may be similar to the controller 150 of FIG. 1. Likewise, the memory dies 605 may be similar to the first memory die 165 and/or the second memory die 170 of FIG. 1.

FIG. 5 is a perspective view of a storage device 500 that includes three-dimensional (3D) stacked non-volatile memory according to an example. In this example, the storage device 500 includes a substrate 510. Blocks of memory cells are included on or above the substrate 510. The blocks include a first block (BLK0 520) and a second block (BLK1 530). Each block is formed of memory cells (e.g., non-volatile memory elements). The substrate 510 also includes a peripheral area 540 having support circuits that are used by the first block and the second block.

The substrate 510 also carries circuits under the blocks, along with one or more lower metal layers which are patterned in conductive paths to carry signals from the circuits. In an example, the blocks are formed in an intermediate region 550 of the storage device 500. The storage device also includes an upper region 560. The upper region 560 includes one or more upper metal layers that are patterned in conductive paths to carry signals from the circuits. Each block of memory cells includes a stacked area of memory cells. In an example, alternating levels of the stack represent wordlines. While two blocks are depicted, additional blocks may be used and extend in the x-direction and/or the y-direction.

In an example, a length of a plane of the substrate 510 in the x-direction represents a direction in which signal paths for wordlines or control gate lines extend (e.g., a wordline or drain-end select gate (SGD) line direction) and the width of the plane of the substrate 510 in the y-direction represents a direction in which signal paths for bit lines extend (e.g., a bit line direction). The z-direction represents a height of the storage device 500.

FIG. 6 is a functional block diagram of a storage device 600 according to an example. In an example, the storage device 600 is similar to the 3D stacked non-volatile storage device 500 shown and described with respect to FIG. 5. In an example, the components depicted in FIG. 6 are electrical circuits. In an example, the storage device 600 includes one or more memory dies 605. Each memory die 605 includes a three-dimensional memory structure 610 of memory cells (e.g., a 3D array of memory cells), control circuitry 615, and read/write circuits 620. In another example, a two-dimensional array of memory cells may be used. The memory structure 610 is addressable by wordlines using a first decoder 625 (e.g., a row decoder) and by bit lines using a second decoder 630 (e.g., a column decoder). The read/write circuits 620 may also include multiple sense blocks 635 including SB1, SB2, . . . , SBp (e.g., sensing circuitry) which allow pages of the memory cells to be read or programmed in parallel. The sense blocks 635 may include bit line drivers.

In an example, a controller 640 is included in the same storage device 600 as the one or more memory dies 605. In another example, the controller 640 is formed on a die that is bonded to a memory die 605, in which case each memory die 605 may have its own controller 640. In yet another example, a controller die controls all of the memory dies 605. Although a single controller 640 is shown, the storage device 600 can include multiple controllers with each controller responsible for different operations described herein.

Commands and data are transferred between a host 645 and the controller 640 using a data bus 650. Additionally, commands and data are transferred between the controller 640 and one or more of the memory dies 605 by way of lines 655. In one example, the memory die 605 includes a set of input and/or output (I/O) pins that connect to lines 655.

The memory structure 610 also includes one or more arrays of memory cells. The memory cells are arranged in a three-dimensional array or a two-dimensional array. The memory structure 610 includes any type of non-volatile memory that is formed on one or more physical levels of arrays of memory cells having an active area disposed above a silicon substrate. The memory structure 610 may be in a non-volatile memory device having circuitry associated with the operation of the memory cells, whether the associated circuitry is above or within the substrate.

The control circuitry 615 works in conjunction with the read/write circuits 620 to perform memory operations (e.g., erase, program, read, and others) on the memory structure 610. The control circuitry 615 may include registers, ROM fuses, and other devices for storing default values such as base voltages and other parameters.

The control circuitry 615 also includes a state machine 660, an on-chip address decoder 665 and a power control module. The state machine 660 provides chip-level control of various memory operations, such as selecting a memory block for programming. The state machine 660 is programmable by software. In another example, the state machine 660 does not use software and is completely implemented in hardware (e.g., electrical circuits).

The on-chip address decoder 665 provides an address interface between addresses used by host 645 and/or the controller 640 to a hardware address used by the first decoder 625 and the second decoder 630. The power control module 670 controls power and voltages that are supplied to the wordlines and bit lines during memory operations. The power control module 670 may include drivers for wordline layers in a 3D configuration, select transistors (e.g., SGS and SGD transistors) and source lines. The power control module 670 may include one or more charge pumps for creating voltages. In an example, the power control module 670 helps ensure wordlines of the grown bad block described herein are programmed at the desired levels.

The control circuitry 615, the state machine 660, the on-chip address decoder 665, the first decoder 625, the second decoder 630, the power control module 670, the sense blocks 635, the read/write circuits 620, and/or the controller 640 may be considered one or more control circuits and/or a managing circuit that perform some or all of the operations described herein.

In an example, the controller 640, is an electrical circuit that may be on-chip or off-chip. Additionally, the controller 640 may include one or more processors 680, ROM 685, RAM 690, memory interface 695, and host interface 697, all of which may be interconnected. In an example, the one or more processors 680 is one example of a control circuit. Other examples can use state machines or other custom circuits designed to perform one or more functions. Devices such as ROM 685 and RAM 690 may include code such as a set of instructions. One or more of the processors 680 may be operable to execute the set of instructions to provide some or all of the functionality described herein.

Alternatively or additionally, one or more of the processors 680 may access code from a memory device in the memory structure 610, such as a reserved area of memory cells connected to one or more wordlines. The memory interface 695, in communication with ROM 685, RAM 690, and one or more of the processors 680, may be an electrical circuit that provides an electrical interface between the controller 640 and the memory die 605. For example, the memory interface 695 may change the format or timing of signals, provide a buffer, isolate from surges, latch I/O, and so forth.

The one or more processors 680 may issue commands to control circuitry 615, or any other component of memory die 605, using the memory interface 695. The host interface 697, in communication with the ROM 685, the RAM 695, and the one or more processors 680, may be an electrical circuit that provides an electrical interface between the controller 640 and the host 645. For example, the host interface 697 may change the format or timing of signals, provide a buffer, isolate from surges, latch I/O, and so on. Commands and data from the host 645 are received by the controller 640 by way of the host interface 697. Data sent to the host 645 may be transmitted using the data bus 650.

Multiple memory elements in the memory structure 610 may be configured so that they are connected in series or so that each element is individually accessible. By way of a non-limiting example, flash memory devices in a NAND configuration (e.g., NAND flash memory) typically contain memory elements connected in series. A NAND string is an example of a set of series-connected memory cells and select gate transistors.

A NAND flash memory array may also be configured so that the array includes multiple NAND strings. In an example, a NAND string includes multiple memory cells sharing a single bit line and are accessed as a group. Alternatively, memory elements may be configured so that each memory element is individually accessible (e.g., a NOR memory array). The NAND and NOR memory configurations are examples and memory cells may have other configurations.

The memory cells may be arranged in the single memory device level in an ordered array, such as in a plurality of rows and/or columns. However, the memory elements may be arrayed in non-regular or non-orthogonal configurations, or in structures not considered arrays.

In an example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, such as in the y direction) with each column having multiple memory cells. The vertical columns may be arranged in a two-dimensional arrangement of memory cells, with memory cells on multiple vertically stacked memory planes. Other configurations of memory elements in three dimensions can also constitute a 3D memory array.

In another example, in a 3D NAND memory array, the memory elements may be coupled together to form vertical NAND strings that traverse across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

In accordance with the above, examples of the present disclosure describe a method, comprising: identifying a grown bad block of a memory device; determining whether the grown bad block is correctable; and based, at least in part, on determining the grown bad block is correctable: identifying one or more wordlines associated with the grown bad block; and performing a manual block write process on the one or more wordlines to close a leakage path associated with the grown bad block. In an example, the leakage path enables a current to flow between a bit line associated with the grown bad block and a ground path associated with the grown bad block. In an example, the manual block write process includes programming the one or more wordlines with a voltage that exceeds a programming voltage associated with other memory blocks of the memory device. In an example, the manual block write process comprises: programming a first subset of the one or more wordlines using a first voltage, the first voltage exceeding a programming voltage associated with other memory blocks of the memory device; and programming a second subset of the one or more wordlines using a second voltage, the second voltage exceeding the first voltage. In an example, the second subset of the one or more wordlines includes at least four wordlines. In an example, the method also includes determining whether a threshold number of program/erase (P/E) cycles have occurred on the memory device. In an example, the method also includes storing information associated with the grown bad block when it is determined the grown bad block is uncorrectable.

Examples also describe a data storage device, comprising: a controller; and a bad block management system operable to: identify whether a memory block of the data storage device is classifiable as a grown bad block; and based, at least in part, on classifying the memory block as a grown bad block: identify a plurality of wordlines associated with the memory block; and initiate a manual block write process on the plurality of wordlines of the memory block to close a current leakage path associated with the memory block. In an example, the bad block management system is further operable to determine whether the memory block is correctable. In an example, the bad block management system is further operable to notify a host device that the memory block is uncorrectable. In an example, the current leakage path enables a current to flow between a bit line associated with the memory block and a ground path associated with the memory block. In an example, initiating the manual block write process comprises programming the plurality of wordlines with a voltage that exceeds a programming voltage associated with other memory blocks associated with the data storage device. In an example, initiating the manual block write process comprises: programming a first subset of the plurality of wordlines using a first voltage, the first voltage exceeding a programming voltage associated with other memory blocks of the memory device; and programming a second subset plurality of wordlines using a second voltage, the second voltage exceeding the first voltage. In an example, the second subset of the plurality of wordlines includes at least four wordlines.

Examples also describe a non-volatile storage device, comprising: one or more memory dies; means for determining whether a memory block of the one or more memory dies is a grown bad block; means for identifying a plurality of wordlines associated with the memory block; and means for performing a manual block write process on the plurality of wordlines associated with the memory block, the manual block write process closing a leakage path associated with the memory block. In an example, the non-volatile storage device also includes means for determining whether the memory block is correctable. In an example, the non-volatile storage device also includes means for notifying a host device associated with the non-volatile storage device that the memory block is uncorrectable. In an example, the non-volatile storage device also includes means for storing information associated with the memory block when it is determined the memory block is uncorrectable. In an example, the manual block write process comprises programming the plurality of wordlines using a voltage that exceeds a programming voltage associated with other memory blocks associated with the non-volatile storage device. In an example, the manual block write process comprises: programming a first subset of the plurality of wordlines using a first voltage, the first voltage exceeding a programming voltage associated with other memory blocks of the memory device; and programming a second subset plurality of wordlines using a second voltage, the second voltage exceeding the first voltage.

One of ordinary skill in the art will recognize that the technology described herein is not limited to a single specific memory structure, but covers many relevant memory structures within the spirit and scope of the technology as described herein and as understood by one of ordinary skill in the art.

The description and illustration of one or more aspects provided in the present disclosure are not intended to limit or restrict the scope of the disclosure in any way. The aspects, examples, and details provided in this disclosure are considered sufficient to convey possession and enable others to make and use the best mode of claimed disclosure.

The claimed disclosure should not be construed as being limited to any aspect, example, or detail provided in this disclosure. Regardless of whether shown and described in combination or separately, the various features (both structural and methodological) are intended to be selectively rearranged, included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this dislcosure that do not depart from the broader scope of the claimed disclosure.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

References to an element herein using a designation such as "first," "second," and so forth does not generally limit the quantity or order of those elements. Rather, these designations may be used as a method of distinguishing between two or more elements or instances of an element. Thus, reference to first and second elements does not mean that only two elements may be used or that the first element precedes the second element. Additionally, unless otherwise stated, a set of elements may include one or more elements.

Terminology in the form of "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As an additional example, "at least one of: A, B, or C" is intended to cover A, B, C, A-B, A-C, B-C, and A-B-C, as well as multiples of the same members. Likewise, "at least one of: A, B, and C" is intended to cover A, B, C, A-B, A-C, B-C, and A-B-C, as well as multiples of the same members.

Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

What is claimed is:

1. A method, comprising:
    identifying a grown bad block of a memory device;
    determining whether the grown bad block is correctable; and
    based, at least in part, on determining the grown bad block is correctable:
        identifying a plurality of wordlines associated with the grown bad block; and
        performing a manual block write process on the plurality of wordlines to close a leakage path associated with the grown bad block, the manual block write processes comprising:
            programming a first subset of the plurality of wordlines associated with the grown bad block using a first voltage, the first voltage exceeding a programming voltage associated with other memory blocks of the memory device; and
            programming a second subset of the plurality of wordlines associated with the grown bad block using a second voltage that exceeds the first voltage.

2. The method of claim 1, wherein the leakage path enables a current to flow between a bit line associated with the grown bad block and a ground path associated with the grown bad block.

3. The method of claim 1, wherein the second subset of the plurality of wordlines includes at least four wordlines.

4. The method of claim 1, further comprising determining whether a threshold number of program/erase (P/E) cycles have occurred on the memory device.

5. The method of claim 1, further comprising storing information associated with the grown bad block when it is determined the grown bad block is uncorrectable.

6. A data storage device, comprising:
    a controller; and
    a bad block management system associated with the controller and operable to:
        identify whether a memory block of the data storage device is classified as a grown bad block; and
        based, at least in part, on the memory block being classified as a grown bad block:
            identify a plurality of wordlines associated with the memory block; and
            initiate a manual block write process on the plurality of wordlines of the memory block to close a leakage path associated with the memory block, the manual block write process comprising:
                programming a first subset of the plurality of wordlines associated with the grown bad block using a first voltage, the first voltage exceeding a programming voltage associated with other memory blocks; and
                programming a second subset of the plurality of wordlines associated with the grown bad block using a second voltage that is higher than the first voltage.

7. The data storage device of claim 6, wherein the bad block management system is further operable to determine whether the memory block is correctable.

8. The data storage device of claim 7, wherein the bad block management system is further operable to notify a host device that the memory block is uncorrectable.

9. The data storage device of claim 6, wherein the current leakage path enables a current to flow between a bit line associated with the memory block and a ground path associated with the memory block.

10. The data storage device of claim 6, wherein the second subset of the plurality of wordlines includes at least four wordlines.

11. A non-volatile storage device, comprising:
    one or more memory dies;
    means for determining whether a memory block of the one or more memory dies is a grown bad block;
    means for identifying a plurality of wordlines associated with the memory block; and
    means for performing a manual block write process on the plurality of wordlines associated with the memory block, the manual block write process comprising:
        programming a first subset of the plurality of wordlines using a first voltage, the first voltage exceeding a programming voltage associated with other memory blocks of the memory device; and
        programming a second subset of the plurality of wordlines using a second voltage, the second voltage exceeding the first voltage.

12. The non-volatile storage device of claim 11, further comprising means for determining whether the memory block is correctable.

13. The non-volatile storage device of claim 11, further comprising means for notifying a host device associated with the non-volatile storage device that the memory block is uncorrectable.

14. The non-volatile storage device of claim 11, further comprising means for storing information associated with the memory block when it is determined the memory block is uncorrectable.

15. The non-volatile storage device of claim 11, further comprising means for determining whether over a threshold number of program/erase (P/E) cycles have occurred on the memory block.

16. The non-volatile storage device of claim 12, wherein the means for determining whether the memory block is correctable executes one or more operations on the memory block, the one or more operations comprising:

a read/verify operation;

an error correction code analysis operation; and a determination regarding an amount of time it takes to perform an error correction operation on data stored in the memory block.

17. The non-volatile storage device of claim 11, wherein programming the first subset of the plurality of wordlines using the first voltage and programming the second subset of the plurality of wordlines using the second voltage comprises programming each of the first subset and the second subset to a particular state.

18. The method of claim 1, wherein programming the first subset of the plurality of wordlines associated with the grown bad block using the first voltage and programming the second subset of the plurality of wordlines associated with the grown bad block using the second voltage comprises programming each of the first subset and the second subset to a particular state.

19. The method of claim 1, the second subset of the plurality of wordlines are programmed using the second voltage after being previous programmed using the first voltage.

20. The data storage device of claim 6, wherein the second subset of the plurality of wordlines were part of the first subset of the plurality of wordlines when the first subset of the plurality of wordlines were programmed using the first voltage.

* * * * *